(12) United States Patent
Zhou et al.

(10) Patent No.: US 8,821,616 B2
(45) Date of Patent: *Sep. 2, 2014

(54) ZEOLITE DDR NANOPARTICLES (75) Inventors: Zhengzhi Zhou, Atlanta, GA (US); Sankar Nair, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 200 days.

This patent is subject to a terminal disclaimer.

(21) Appl. No.: 13/396,411

(22) Filed: Feb. 14, 2012

(65) Prior Publication Data
US 2012/0247336 A1 Oct. 4, 2012

Related U.S. Application Data (60) Provisional application No. 61/471,238, filed on Apr. 4, 2011.

(51) Int. Cl.
*B01D 71/02* (2006.01)
*B01D 53/22* (2006.01)
*C01B 39/00* (2006.01)
*B01D 67/00* (2006.01)
*C01B 37/02* (2006.01)
*B01D 69/14* (2006.01)

(52) U.S. Cl.
CPC ........... *B01D 53/228* (2013.01); *C01P 2004/64* (2013.01); *B01D 67/0051* (2013.01); *B01D 71/028* (2013.01); *B01D 2323/08* (2013.01); *C01B 37/02* (2013.01); *B01D 69/148* (2013.01)
USPC .............. 96/4; 96/11; 95/51; 210/650; 502/4; 502/64; 423/702; 423/709; 427/372.2; 428/402

(58) Field of Classification Search
USPC ........... 96/4, 11; 95/51; 210/640, 650; 502/4, 502/60, 62, 64; 423/702, 706, 709, 210, 423/230; 427/372.2; 428/402
See application file for complete search history.

(56) References Cited

U.S. PATENT DOCUMENTS

| | | |
|---|---|---|
| 6,953,493 B2 | 10/2005 | Nakayama et al. |
| 7,014,680 B2 | 3/2006 | Nakayama et al. |
| 7,973,090 B2 | 7/2011 | Suzuki et al. |

(Continued)

FOREIGN PATENT DOCUMENTS

WO PCT/US2012/025064 2/2012

OTHER PUBLICATIONS

H. Gies, Studies on Clathrasils. IX—Crystal Structure of Deca-Dodecasil 3R, The Missing Link Between Zeolites and Clathrasils, Zeitschrift für Kristallographie 175, 93-104 (1986).

(Continued)

*Primary Examiner* — Jason M Greene
(74) *Attorney, Agent, or Firm* — Gardere Wynne Sewell LLP; Chris P. Perque; Teresa J. Lechner-Fish (57) ABSTRACT

DDR nanocrystals were synthesized using hydrothermal secondary growth. The morphology of the nanoparticles can be manipulated by changing the ratio of silica to water, the synthesis temperature, and the mineralizing agents. Specifically, nanocrystals with morphology of hexagonal plates, octahedral, and diamond-like plates are disclosed. These nanoparticles can be used as seed coatings for DDR membrane growth on substrates, and for the fabrication of mixed matrix membranes, and for any other use where uniform, small DDR zeolite crystals are beneficial.

28 Claims, 3 Drawing Sheets

(56) References Cited

U.S. PATENT DOCUMENTS

| | | | |
|---|---|---|---|
| 8,302,782 B2* | 11/2012 | Falconer et al. | 55/523 |
| 8,673,057 B2* | 3/2014 | Zhou et al. | 95/45 |
| 2004/0139908 A1 | 7/2004 | Bowe et al. | |
| 2004/0173094 A1 | 9/2004 | Nakayama et al. | |
| 2005/0204916 A1 | 9/2005 | Falconer et al. | |
| 2005/0233945 A1 | 10/2005 | Brown et al. | |
| 2006/0201884 A1 | 9/2006 | Kulprathipanja et al. | |
| 2007/0022877 A1 | 2/2007 | Marand et al. | |
| 2007/0244347 A1 | 10/2007 | Ying et al. | |
| 2008/0047432 A1 | 2/2008 | Nonaka et al. | |
| 2008/0214686 A1* | 9/2008 | Suzuki et al. | 210/500.21 |
| 2008/0261101 A1 | 10/2008 | de Figueiredo Gomes et al. | |
| 2009/0004084 A1 | 1/2009 | Bell et al. | |
| 2009/0011926 A1 | 1/2009 | Yajima et al. | |
| 2009/0111959 A1* | 4/2009 | Cao et al. | 502/60 |
| 2009/0131643 A1 | 5/2009 | Ni et al. | |
| 2009/0152755 A1 | 6/2009 | Liu et al. | |
| 2009/0155464 A1 | 6/2009 | Liu et al. | |
| 2009/0211440 A1 | 8/2009 | Reyes et al. | |
| 2010/0006503 A1 | 1/2010 | Bratton et al. | |
| 2010/0132549 A1 | 6/2010 | Yaghi et al. | |
| 2010/0144512 A1 | 6/2010 | Uchikawa et al. | |
| 2011/0160039 A1 | 6/2011 | Himeno et al. | |
| 2011/0298115 A1 | 12/2011 | Celaya et al. | |
| 2011/0319630 A1 | 12/2011 | Yaghi et al. | |
| 2012/0070904 A1 | 3/2012 | Stoddart et al. | |
| 2012/0202006 A1 | 8/2012 | Rimer | |

OTHER PUBLICATIONS

Den Exter, M.J., J.C. Jansen, and H. Van Bekkum, Separation of permanent gases on the all-silica 8-ring clathrasil DD3R in Zeolites and Related Microporous Materials: State of the Art 1994, J. Weitkamp, et al., Editors. 1994. p. 1159-1166.

Gascon, J., et al., Accelerated synthesis of all-silica DD3R and its performance in the separation of propylene/propane mixtures. Microporous and Mesoporous Materials, 2008. 115(3): p. 585-593.

Yang, Q.L., S.L. Zhong, and X. Lin, Synthesis of DDR-Type Zeolite in Fluoride Medium. Chinese Journal of Inorganic Chemistry, 2009. 25(2): p. 191-194.

Tomita, T., K. Nakayama, and H. Sakai, Gas separation characteristics of DDR type zeolite membrane. Microporous and Mesoporous Materials, 2004. 68(1-3): p. 71-75.

Himeno, S., et al., Characterization and selectivity for methane and carbon dioxide adsorption on the all-silica DD3R zeolite. Microporous and Mesoporous Materials, 2007. 98(1-3): p. 62-69.

Aguado, Sonia, et al., *Facile synthesis of an ultramicroporous MOF tubular membrane with selectivity towards $CO_2$*, New J. Chem., 2011, 35, pp. 41-44.

Bae, Tae-Hyun, et al., *A high-performance gas-separation membrane containing submicrometer-sized metal-organic framework crystals*, Angew. Chem. Int. Edit. 49 (2010), pp. 9863-9866.

Baker, Richard W., *Future directions of membrane gas separation technology*, Ind. Eng. Chem. Res., 2002, 41(6), pp. 1393-1411.

Baker, Richard W. and Kaaeid Lokhandwala, *Natural gas processing with membranes: An overview*, Ind. Eng. Chem. Res., 2008, 47(7), pp. 2109-2121.

Brar, Tejinder, et al., *Control of crystal size and distribution of zeolite A*, Ind. Eng. Chem. Res., 2001, 40, pp. 1133-1139.

Bux, Helge, et al., *Oriented zeolitic imidazolate framework-8 membrane with sharp $H_2/C_3H_8$ molecular sieve separation*, Chem. Mater., 2011, 23, pp. 2262-2269.

Bux, Helge, et al., *Zeolitic imidazolate framework membrane with molecular sieving properties by microwave-assisted solvothermal synthesis*, J. Am. Chem. Soc., 2009, 131(44), pp. 16000-16001.

Caro, Jüergen and Manfred Noack, *Zeolite membranes—Recent developments and progress*, Micropor. Mesopor. Mater., 2008, 115, pp. 215-233.

Carreon, Moises A., et al., *Alumina-supported SAPO-34 membranes for $CO_2/CH_4$ separation*, J. Am. Chem. Soc., 2008, 130(16), pp. 5412-5413.

Centrone, Andrea, et al., *Growth of metal-organic frameworks on polymer surfaces*, J. Am. Chem. Soc., 2010, 132(44), pp. 15687-15691.

Chen, Banglin, et al., *A microporous metal-organic framework for gas-chromatographic separation of alkanes*, Agnew. Chem. Int. Ed., 2006, 45, pp. 1390-1393.

Chiu, W. V., et al., *Post-synthesis defect abatement of inorganic membranes for gas separation*, J. Membr. Sci., 2011, 377, pp. 182-190.

Choi, Jungkyu, et al., *Grain boundary defect elimination in a zeolite membrane by rapid thermal processing*, Science, 2009, 325, pp. 590-593.

Cui, Ying, et al., *Preparation and gas separation properties of zeolite T membrane*, Chem. Comm., 2003, 17, pp. 2154-2155.

Cui, Ying, et al., *Preparation and gas separation performance of zeolite T membrane*, J. Mater. Chem., 2004, 14(5), pp. 924-932.

Favre, Eric, *Carbon dioxide recovery from post-combustion processes: Can gas permeation membranes compete with absorption?*, J. Membr. Sci., 2007, 294, pp. 50-59.

Forster, Paul M., et al., *A high-throughput investigation of the role of pH, temperature, concentration, and time on the synthesis of hybrid inorganic-organic materials*, Angew. Chem. Int. Ed., 2005, 44, pp. 7608-7611.

Ge, Qinqin, et al., *High-performance zeolite NaA membranes on polymer-zeolite composite hollow fiber supports*, J. Am. Chem. Soc. 131(47) (2009), 17056-57.

Hao, Ji Hua and Shichang Wang, *Influence of quench medium on the structure and gas permeation properties of cellulose acetate membranes*, J. Appl. Polym. Sci., 1998, 68(8), pp. pp. 1269-1276.

Heng, Samuel, et al., *Low-temperature ozone treatment for organic template removal from zeolite membrane*, J. Membr. Sci., 2004, 243, pp. 69-78.

Himeno, Shuji, et al., *Synthesis and permeation properties of a DDR-type zeolite membrane for separation of $CO_2/CH_4$ gaseous mixtures*, Ind. Eng. Chem. Res., 2007, 46(21), pp. 6989-6997.

Huang, Aisheng, et al., *Molecular-sieve membrane with hydrogen permselectivity: ZIF-22 in LTA topology prepared with 3-aminopropyltriethoxysilane as covalent linker*, Angew. Chem. Int. Ed., 2010, 49, pp. 4958-4961.

Huang, Aisheng, et al., *Steam-stable zeolitic imidazolate framework ZIF-90 membrane with hydrogen selectivity through covalent functionalization*, J. Am. Chem. Soc., 2010, 132(44), pp. 15562-15564.

Huang, Aisheng and Jürgen Caro, *Cationic polymer used to capture zeolite precursor particles for the facile synthesis of oriented zeolite LTA molecular sieve membrane*, Chem. Mater., 2010, 22(15), pp. 4353-4355.

Huang, Aisheng, & Jürgen Caro, *Covalent post-functionalization of zeolitic imidazolate framework ZIF-90 membrane for enhanced hydrogen selectivity*, Angew. Chem. Int. Ed., 2011, 50, pp. 4979-4982.

Husain, Shabbir, Mixed Matrix Dual Layer Hollow Fiber Membranes for Natural Gas Separation, Dissertation, Georgia Institute of Technology, Atlanta, GA, 2006, pp. 48-49.

Jang, Kwang-Suk, et al., *Modified mesoporous silica gas separation membranes on polymeric hollow fibers*, Chem. Mater., 2011, 23, pp. 3025-3028.

Jee, Sang Eun and David S. Sholl, *Carbon dioxide and methane transport in DDR zeolite: Insights from molecular simulations into carbon dioxide separations in small pore zeolites*, J. Am. Chem. Soc., 2009, 131(22), pp. 7896-7904.

Jie, Xingming, et al., *Gas permeation performance of cellulose hollow fiber membranes made from the cellulose/N-methylmorpholine-N-oxide/$H_2O$ system*, J. Appl. Polym. Sci., 2004, 91(3), pp. 1873-1880.

Kanezashi, Masakoto, et al., *Gas permeation through DDR-type zeolite membranes at high temperatures*, AIChE J., 2008, 54(6), pp. 1478-1486.

Koros, William J. and Rajiv Mahajan, *Pushing the limits on possibilities for large scale gas separation: Which strategies?*, J. Membr. Sci., 2000, 175, pp. 181-196.

Kuhn, Jelan, et al., *Detemplation of DDR type zeolites by ozonication*, Micropor. Mesopor. Mater., 2009, 120, pp. 12-18.

(56) References Cited

OTHER PUBLICATIONS

Kumar, P. et al., *Ordered mesoporous membranes: Effects of support and surfactant removal conditions on membrane quality*, J. Membr. Sci., 2006, 279, pp. 539-547.
Kusakabe, Katsuki, et al., *Formation of a Y-type zeolite membrane on a porous alpha-alumina tube for gas separation*, Ind. Eng. Chem. Res., 1997, 36(3), pp. 649-655.
Li, Shiguang, et al., *Scale-up of SAPO-34 membranes for $CO_2/CH_4$ separation*, J. Membr. Sci., 2010, 352, pp. 7-13.
Li, Yan-Shuo, et al., *Molecular sieve membrane: Supported metal-organic framework with high hydrogen selectivity*, Angew. Chem. Int. Edit., 2010, 49, pp. 548-551.
Li, Zong-Qun, et al., *Fabrication of nanosheets of a fluorescent metal-organic framework $[Zn(BDC)(H_2O)]_n$ (BDC = 1,4-benzenedicarboxylate): Ultrasonic synthesis and sensing of ethylamine*, Inorganic Chemistry Communications, 2008, 11(11), pp. 1375-1377.
Lindmark, Jonas and Jonas Hedlund, *Modification of MFI membranes with amine groups for enhanced $CO_2$ selectivity*, J. Mater. Chem., 2010, 20(11), pp. 2219-2225.
Liu, Xin-Lei, et al., *An organophilic pervaporation membrane derived from metal-organic framework nanoparticles for efficient recovery of bio-alcohols*, Angew. Chem. Int. Ed., 2011, 50(45), pp. 10636-10639.
Liu, Yunyang, et al., *Synthesis and characterization of ZIF-69 membranes and separation for $CO_2/CO$ mixture*, J. Membr. Sci., 2010, 353, pp. 36-40.
Liu, Yunyang, et al., *Synthesis of highly c-oriented ZIF-69 membranes by secondary growth and their gas permeation properties*, J. Membr. Sci., 2011, 379, pp. 46-51.
Ma, Bao-Qing, et al., *Microporous pillared paddle-wheel frameworks based on mixed-ligand coordination of zinc ions*, Inorg. Chem., 2005, 44(14), pp. 4912-4914.
Matsuda, H., et al., *Improvement of ethanol selectivity of silicalite membrane in pervaporation by silicone rubber coating*, J. Membr. Sci., 2002, 210(2), pp. 433-437.
McCarthy, Michael C., et al., *Synthesis of zeolitic imidazolate framework films and membranes with controlled microstructures*, Langmuir, 2010, 26(18), pp. 14636-14641.
Morris, William, et al., *Crystals as molecules: Postsynthesis covalent functionalization of zeolitic imidazolate frameworks*, J. Am. Chem. Soc., 2008, 130(38), pp. 12626-12627.
Nair, Sankar, et al., *Separation of close boiling hydrocarbon mixtures by MFI and FAU membranes made by secondary growth*, Micropor. Mesopor. Mater., 2001, 48, pp. 219-228.
Pachfule, Pradip, et al., *Solvothermal synthesis, structure, and properties of metal organic framework isomers derived from a partially fluorinated link*, Cryst. Growth Des., 2011, 11, pp. 1215-1222.
Pan, Long, et al., *Microporous metal organic materials: Promising candidates as sorbents for hydrogen storage*, J. Am. Chem. Soc., 2004, 126(5), pp. 1308-1309.
Pan, Yichang and Zhiping Lai, *Sharp separation of $C_2/C_3$ hydrocarbon mixtures by zeolitic imidazolate framework-8 (ZIF-8) membranes synthesized in aqueous solutions*, Chem. Commun., 2011, 47, pp. 10275-10277.
Parikh, Atul N., et al., *Non-thermal calcination by ultraviolet irradiation in the synthesis of microporous materials*, Micropor. Mesopor. Mater., 2004, 76, pp. 17-22.
Qiu, Wulin, et al., *Dehydration of ethanol-water mixtures using asymmetric hollow fiber membranes from commercial polyimides*, J. Membr. Sci., 2009, 327, pp. 96-103.
Ranjan, Rajiv and Michael Tsapatsis, *Microporous metal organic framework membrane on porous support using the seeded growth method*, Chem. Mater., 2009, xxx(xx), 000-000.
Sommer, Stefan and Thomas Melin, *Influence of operation parameters on the separation of mixtures by pervaporation and vapor permeation with inorganic membranes. Part 1: Dehydration of solvents*, Chem. Eng. Sci., 2005, 60, pp. 4509-4523.
Son, Won-Jin, et al., *Sonochemical syntheis of MOF-5*, Chem. Commun., 2008, 47, pp. 6336-6338.
Van Den Bergh, J., et al., *Separation and permeation characteristics of a DD3R zeolite membrane*, J. Membr. Sci., 2008, 316, pp. 35-45.
Van Den Bergh, Johan, et al., *Modeling permeation of $CO_2/CH_4$, $N_2/CH_4$, and $CO_2$/air mixtures across a DD3R zeolite membrane*, J. Phys. Chem., 2010, C, 114(20), pp. 9379-9389.
Venna, Surendar R. and Moises A. Carreon, *Highly permeable zeolite imidazolate framework-8 membranes for $CO_2/CH_4$ separation*, J. Am. Chem. Soc., 2010, 132(1), pp. 76-78.
Watanabe, Taku, et al., *Computational identification of a metal organic framework for high selectivity membrane-based $CO_2/CH_4$ separations: $Cu(hfipbb)(H2hfipbb)_{0.5}$*, Phys. Chem. Chem. Phys., 2009, 11, pp. 11389-11394.
Weh, K., et al., *Permeation of single gases and gas mixtures through faujasite-type molecular sieve membrances*, Micropor. Mesopor. Mater., 2002, 54, pp. 27-36.
Xomeritakis, George, et al., *Transport properties of alumina-supported MFI membranes made by secondary (seeded)growth*, Micropor. Mesopor. Mater., 2000, 38, pp. 61-73.
Xu, Gengsheng, et al., *Preparation of ZIF-8 membranes supported on ceramic hollow fibers from a concentrated synthesis gel*, J. Membr. Sci. 2011, 385-386, pp. 187-193.
Yaghi, Omar M., et al., *Reticular synthesis and the design of new materials*, Nature, Jun. 12, 2003, 423, pp. 705-714.
Yan, Yushan, et al., *Preparation of highly selective zeolite ZSM-5 membranes by a post-synthetic coking treatment*, J. Membr. Sci., 1997, 123(1), pp. 95-103.
Yang, Lisha and Huimin Lu, *Microwave-assisted ionothermal synthesis and characterization of zeolitic imidazolate framework-8*, Chinese J. Chem., 2012, 30, pp. 1040-1044.
Yao, Jianfeng, et al., *Contra-diffusion synthesis of ZIF-8 films on a polymer substrate*, Chem. Commun., 2011, 47, pp. 2559-2561.
Yoo, Won Cheol, et al., *High-performance randomly oriented zeolite membranes using brittle seeds and rapid thermal processing*, Angew. Chem. Int. Ed., 2010, 49, pp. 8699-8703.
Zhang, Yanfeng, et al., *Blocking defects in SAPO-34 membranes with cyclodextrin*, J. Membr. Sci., 2010, 358, pp. 7-12.
Zheng, Zhenkun, et al., *Synthesis, characterization and modification of DDR membranes grown on alpha-alumina supports*, J. Mater. Sci., 2008, 43, pp. 2499-2502.
International Search Report issued May 25, 2012 for PCT/US2012/025080.
International Search Report issued Nov. 6, 2012 for PCT/US2012/054817.
International Search Report issued Feb. 23, 2012 for PCT/US2011/047769.
International Search Report issued Oct. 18, 2013 for PCT/US2013/042075.
Mar. 5, 2013 Office Action mailed for U.S. Appl. No. 13/611,988, filed Sep. 12, 2012.
Jun. 5, 2013 Response to Office Action mailed Mar. 5, 2013 for U.S. Appl. No. 13/611,988, filed Sep. 12, 2012.
Jun. 10, 2013 Office Action/Noncompliant Amendment mailed for U.S. Appl. No. 13/611,988, filed Sep. 12, 2012.
Jun. 14, 2013 Response to Office Action mailed Jun. 10, 2013 for U.S. Appl. No. 13/611,988, filed Sep. 12, 2012.
Sep. 5, 2013 Office Action mailed for U.S. Appl. No. 13/611,988, filed Sep. 12, 2012.
Nov. 5, 2013 Response to Office Action mailed Sep. 5, 2013 for U.S. Appl. No. 13/611,988, filed Sep. 12, 2012.
Nov. 18, 2013 Notice of Allowability mailed for U.S. Appl. No. 13/611,988, filed Sep. 12, 2012.
Nov. 20, 2013 Notice of Allowability mailed for U.S. Appl. No. 13/399,645, filed Feb. 17, 2012.

\* cited by examiner

FIGURE 1

DDR building block

DDR pore structure

ZEOLITE DDR NANOPARTICLES

PRIOR RELATED APPLICATIONS

This application claims priority to U.S. Provisional Application Ser. No. 61/471,238, filed Apr. 4, 2011, and expressly incorporated by reference herein in its entirety.

FEDERALLY SPONSORED RESEARCH STATEMENT

Not applicable.

FIELD OF THE INVENTION

New methods for synthesizing DDR zeolite nanocrystals (200-2000 nanometers in size) are disclosed using hydrothermal secondary growth (seeded growth). By changing the ratio of silica to water, the synthesis temperature, and the mineralizing agents, the morphology and size of the crystals can be manipulated. Specifically, crystals with morphology of hexagonal plates, octahedral, and diamond-like plates are disclosed. These crystals can be used as seed coatings for DDR membrane growth on substrates, and for the fabrication of mixed matrix membranes, among other uses.

BACKGROUND OF THE INVENTION

The term "zeolite" was originally coined in 1756 by Swedish mineralogist Axel Fredrik Cronstedt, who observed that upon rapidly heating the material stilbite, it produced large amounts of steam from water that had previously been adsorbed into the material. Based on this, the called the material zeolite, from the Greek zeo, meaning "boil" and lithos, meaning "stone".

We now know that zeolites are microporous, aluminosilicate or silicate minerals. As of November 2010, 194 unique zeolite frameworks have been identified (DDR being one of them), and over 40 naturally occurring zeolite frameworks are known.

Zeolites have a porous structure that can accommodate a wide variety of cations, such as Na+, K+, $Ca^{2+}$, $Mg^{2+}$ and many others. These positive ions are rather loosely held and can readily be exchanged for others in a contact solution. Some of the more common mineral zeolites are analcime, chabazite, clinoptilolite, heulandite, natrolite, phillipsite, and stilbite.

The regular pore structure and the ability to vary pore size, shape and chemical nature makes zeolites very useful as molecular sieves. Depending on their structure and composition, zeolites can separate molecules based on adsorption and/or diffusion of certain molecules preferentially inside the pores or exclusion of certain molecules based on their size. The pore size is typically less than 2 nm and comparable to that of small molecules, allowing the use of zeolites to separate lightweight gases such as $CO_2$ and $CH_4$.

The maximum size of a species that can enter the pores of a zeolite is controlled by the dimensions of the channels in the zeolite. These are conventionally defined by the ring size of the aperture, where, for example, the term "8-ring" refers to a closed loop that is built from 8 tetrahedrally coordinated silicon (or aluminum) atoms and 8 oxygen atoms. The rings are not always symmetrical due to a variety of effects, including strain induced by the bonding between units that are needed to produce the overall structure, or coordination of some of the oxygen atoms of the rings to cations within the structure. Therefore, the pores in many zeolites are not cylindrical. The DDR zeolite of this invention has an 8-ring structure (see FIG. 1).

Thus, zeolites are widely used in industry for water purification, as catalysts, and in nuclear reprocessing. Their biggest use is in the production of laundry detergents, and they are also used in medicine and in agriculture.

In particular, zeolites have been used in two types of molecular sieving membranes: mixed matrix membranes and pure zeolite membranes. To fabricate a mixed matrix membranes, zeolite crystals are first dispersed in a polymer solution. The dispersion is then cast into a film or spun into a tubular hollow fiber. Since the membrane thickness is desired to be less than 1 micron, it is necessary to have submicron zeolite particles.

In pure zeolite membrane fabrication, zeolite crystals are first deposited as a "seed" coating on a porous substrate and then grown into a thin continuous layer known as a zeolite membrane. The porous substrate provides mechanical stability for the membrane. In this approach crystals with submicron size are also preferred because the seed coatings will then be tightly packed and of high quality. Further, membrane thickness is ideally about 0.5-5 microns.

Among the various zeolite materials, DDR is a pure silica ($SiO_2$) zeolite. The dimensions of the molecular sieving pores of the DDR zeolite are 3.6×4.4 angstrom. Due to its relatively small pore size, DDR can be used to separate light gases, such as $CO_2$ (kinetic diameter=3.3 angstroms) from $CH_4$ (diameter=3.8 angstroms). Other advantages of DDR zeolites include high thermal stability and chemical resistance due to the pure silica composition.

DDR zeolite crystals were first synthesized in 1986[1] and the synthesis was further developed by several researchers[2-4]. These synthesis methods either take long time (9-25 days) or produce very large crystals (20 to 50 micrometers). DDR zeolite membranes were first reported in 2004[5] and the results showed that $CO_2/CH_4$ selectivity was 220 at 301° K with feed pressure of 0.5 MPa.

However, there is no prior art on the synthesis of micron or nanometer sized DDR crystals, which are critical in fabricating high-quality membranes. In this disclosure, methods for synthesizing nanometer to micron size DDR zeolite crystals are described. Not only can the size and shape of the DDR crystal be controlled, but the synthesis time is significantly shortened. Thus, the methods and compositions described herein are a significant improvement on the prior art.

SUMMARY OF THE INVENTION

The present invention describes a technique to synthesize DDR zeolite crystals with a size in the range of 200 nm up to 2 microns and with control over the morphology and size of the crystals. The synthesis was carried out using seed growth under hydrothermal conditions with mixing. The raw materials solution contains organic template 1-Adamantanamine (ADA), a silica source such as Ludox AS-30 colloidal silica ($SiO_2$), Deionized water (DI) and Potassium Fluoride (KF) and optionally other cations, such as K+, Na+, $Ca^{2+}$, $Mg^{2+}$ and others, can be added to fine tune the zeolites. The range of molar ratios of these chemicals and other parameters are as follows:

ADA/SiO2: 0.06 to 0.5
KF/SiO2: 0.5 to 1.0
DI/SiO2: 2000 to 14000
KOH: 0-2
Heating time 4-72 hrs, preferably 6-12 hours for nanocrystals, and about 36-60 hrs for micron sized crystals
Shorter heat treatment (6-12 hrs) results in smaller crystals (2-500 nm)
Longer heat treatment (about 36-60, preferably 48 hrs) results in larger crystals (2 μm)
Temperature 100-200° C., preferably 130-150° C. or anything in-between or greater than or equal to 160° C.
Temperature ≤150° C. results in nanometer octahedrons
Temperatures ≤150° C. plus KOH (1-2 molar ratio) results in hexagonal plates
Temperatures ≥160° C. results in diamond-like structures Generally speaking, a method of making DDR zeolite crystals is provided, wherein the method comprises combining 1-adamantanamine ("ADA"), deionized water, a silica source, potassium fluoride ("KF"), and optionally a source of cations. This is mixed for a period of time and then seed crystals are added to said mixture. While continuing to mix, the mixture is heated at 100-200° C. for 4-72 hours to make DDR zeolite crystals of 200-2000 nm. If needed for the application, the crystals can be washed and further calcined to remove the ADA.

In preferred embodiments, the mixture comprises xADA: 100 SiO2: yKF: zH$_2$O: mKOH, wherein x is between 6 and 50, y is between 50 and 100, z is between 2000 and 14000, and m is between 0 to 2. Further preferred embodiments include, initial mixing between 30 minutes and 6 hours; temperature of 130-160° C.; heating time between 6 hour and 12 hours.

The invention also includes the various DDR zeolite crystals made according to the above methods, including crystals having the following characteristics: a) size in the range of 200 to 2000 nm, b) a morphology selected from the groups consisting of diamond-like, octahedron, or hexagonal plate, c) a BET surface area in the range of 340 m$^2$/g to 380 m$^2$/g and d) a pore volume from 0.123 to 0.132 ml/g. Also invented are crystals being octahedral of 1000-4000 nm, diamond plate of 200-500 nm, octahedral of 200-500 nm and hexagonal plates, preferably of 200-500 nm. The sizes provided herein are average sizes, and preferably are ±20% and more preferably ±10% or 5%.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is a closed linking verb, and does not allow the inclusion of other elements.

The phrase "consisting essentially of" occupies a middle ground, and does not allow the inclusion of other material elements, but allows the inclusion of non-material elements that do not materially change the invention, such as different buffers, salts, drying steps, rinsing steps, re-precipitation steps, post-synthesis steps, and the like.

Figure 1:
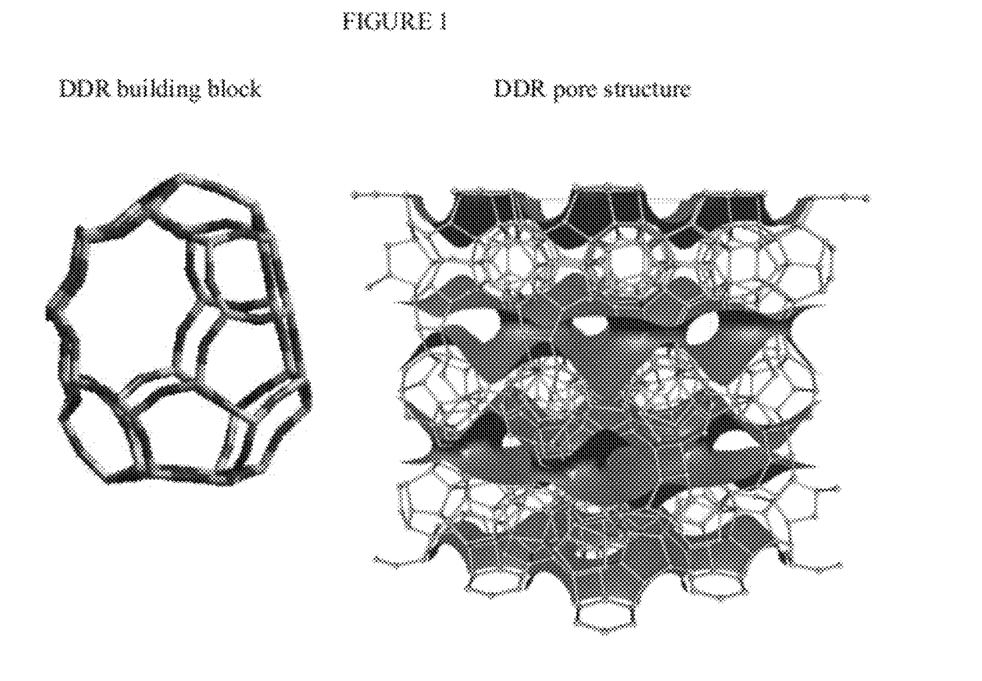
FIG. 1 DDR zeolite structure.

The following abbreviations are used herein:

| | |
|---|---|
| ADA | 1-Adamantanamine |
| BET surface area | BET theory aims to explain the physical adsorption of gas molecules on a solid surface and serves as the basis for the measurement of the specific surface area of a material. In 1938, Stephen Brunauer, Paul Hugh Emmett, and Edward Teller published an article about the BET theory in a journal for the first time; "BET" consists of the first initials of their family names. Methods of calculating same are provided in the literature (e.g., en.wikipedia.org/wiki/BET_theory) |
| DDR | Refers to a type of silica zeolite with an 8 ring structure, as shown in FIG. 1. |
| DI | Deionized water |
| DLS | Dynamic light scattering |
| HR | Hour(s) |
| KF | Potassium Fluoride |
| KOH | Potassium hydroxide |
| PDI | Polydisperity index—a measure of the distribution of molecular mass in a given polymeric sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity. PDI was measured herein by DLS, which gives the size distribution, from which we get the average size and PDI. |
| SEM | Scanning electron micrograph |
| SiO$_2$ | Silica, source Ludox AS-30 colloidal silica |

DESCRIPTION OF EMBODIMENTS OF THE INVENTION

In a typical synthesis by the inventive method described herein, ADA was first dissolved in DI water. Then silica was added to the solution and the solution was mixed. After mixing the solution for 5 to 10 minutes, KF was added to the solution. The solution was mixed for another two hours. A small amount of crystal seeds synthesized using methods reported in literature[4] was added to the solution. The solution was then put inside an autoclave with a Teflon liner and heated up to 160° C. The autoclaves were rotated (end-over-end) with a speed of 60 rpm in order to ensure adequate mixing and dispersal of regents during the seed growth. This mixing also appears to help with obtaining smaller crystals, and is important for nanometer sized crystal production. The reaction time was about 48 hours. The particles were then collected after the autoclaves were cooled to room temperature, washed with DI water and centrifuged until the pH of the wash water was close to 7.0. The particles were then dried and calcined at 700° C. for 8 hours. The ramping rate of calcination was 0.5° C. per minute.

Figure 2:
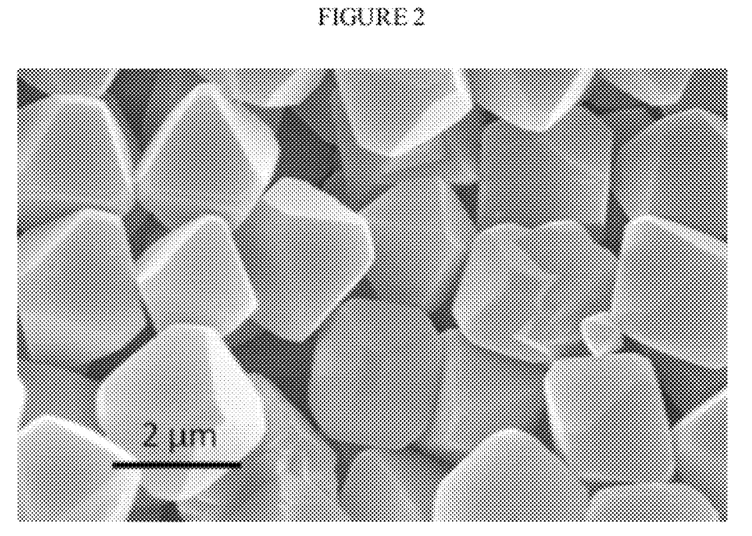
FIG. 2 is an SEM micrograph of DDR zeolite crystals with size of about 2 micrometers.

The particles were first characterized with X-ray powder diffraction (XRD). The XRD pattern (not shown) of the crystals agrees well with the reference XRD pattern, confirming that the desired DDR zeolite was synthesized. The crystals were also observed with scanning electron microscopy (SEM) (FIG. 2), which showed that these first crystals had an octahedral morphology and size of about 2 microns.

The particle size of these crystals was further reduced in subsequent experiments. The as-synthesized 2-micron crystals were ball-milled, and dispersed in water to form a suspension of 0.2~1 g/l. These were used as the seed crystals for the subsequent reactions.

A mixture of ADA, silica, DI water, and KF was prepared as described above. When the mixture was put into the autoclave, 5 to 10 grams of the suspension with ball-milled particles were also added into the autoclaves. Depending on the desirable morphology, 0.1 to 0.3 grams KOH can be added to the solution. The autoclaves were heated to 150-160° C. while rotating the chambers, as above.

The rotation speed was maintained at 60 rpm for these smaller crystals. The reaction time varied from 6-12 hours, shorter times resulting in smaller crystals. The synthesis temperature can also have effect on both size and morphology. Lower temperatures result in smaller crystals and if <150° C. (130, 140 and 150° C. were all tested) leads to nanometer sized octahedrons or hexagonal plates if KOH is also added, while higher temperatures (>160° C.) surprisingly lead to diamond plate like crystals.

The washing and calcination steps were the same as described above for the 2-micrometer crystals, i.e., the particles were washed with DI water and centrifuged until the pH of the wash water was close to 7.0. The particles were then dried and calcined at 700° C. for 8 hours. The ramping rate of calcination was 0.5° C. per minute.

These various DDR zeolite particles were also characterized with XRD, SEM, dynamic light scattering (DLS), and $N_2$ physisorption. DLS provides statistical information about the particle size and particle size distribution, and generally showed a narrow size range for each of our syntheses. $N_2$ physisorption provided information regarding surface area and pore volume for porous materials.

The following examples are illustrative only, and are not intended to unduly limit the scope of the invention.

Example 1

Octahedral DDR

Larger DDR crystals with octahedron morphology and approximate 2-micron size were synthesized in this first Example.

A mixture of ADA, Silica, KF and DI was made with the molar ratio of 6:100:50:8000. ADA was first dissolved in DI water. Due to the low solubility of ADA in water, the mixture was really only partially solubilized and much remained as a suspension of ADA in water. Silica was then added to the suspension and mixed. After mixing the suspension for 5-10 minutes, KF was added to the suspension. The mixture was further mixed at room temperature for 2 hours.

Next 30 grams of the mixture was poured into an autoclave with a Teflon liner of 45 ml. Then 5-10 grams of seed crystals were added to the autoclave. The autoclave was then sealed and heated to 160° C. inside an oven. The reaction was maintained for 48 hours. The autoclaves were then cooled to room temperature. The crystals were collected and washed with DI water and centrifuged for several times. Some of the crystals were calcined at 700° C. for 8 hours to remove the organic template ADA.

The calcined crystals were then characterized with XRD, SEM, and $N_2$ physisorption. The XRD pattern (not shown) agreed well with the reference pattern, confirming the material was a DDR zeolite. The SEM image (FIG. 2) revealed that the crystals from this synthesis method had octahedron morphology. The size of the crystals was estimated from SEM micrograph and was in the range of 2-3 micrometers. Due to their larger size, DLS could be not performed for these crystals. However, BET surface area and pore volume of the crystals from $N_2$ physisorption were 348 $m^2/g$ and 0.124 ml/g, respectively. These results were consistent with the reported values for DDR[6].

Example 2

Diamond DDR

In this Example, we show the synthesis of a DDR crystal with diamond-like morphology and approximate 500×250 nanometer size. General speaking, decreasing the time of the heat treatment unexpectedly changed the morphology and reduced the size.

In a typical synthesis, a mixture of ADA, Silica, KF and DI was made with the molar ratio of 6:100:50:10000. ADA was first dissolved in DI water. Due to the low solubility of ADA in water, the mixture was actually a partial suspension of ADA in water. Silica was then added to the suspension and mixed. After mixing the suspension for 5-10 minutes, KF was added to the suspension. The mixture was further mixed at room temperature for 2 hours.

After the mixture was prepared, 30 grams of the mixture was poured into an autoclave with a Teflon liner of 45 ml. 5 to 10 grams of seed crystals were added to the autoclave. The autoclave was then sealed and heated up to 160° C. inside an oven. The reaction was maintained for 8 hours. The autoclaves were then cooled to room temperature. The crystals were collected and washed with DI water and centrifuged for several times. Some of the crystals were calcined at 700° C. for 8 hours to remove the organic template ADA.

Figure 3:
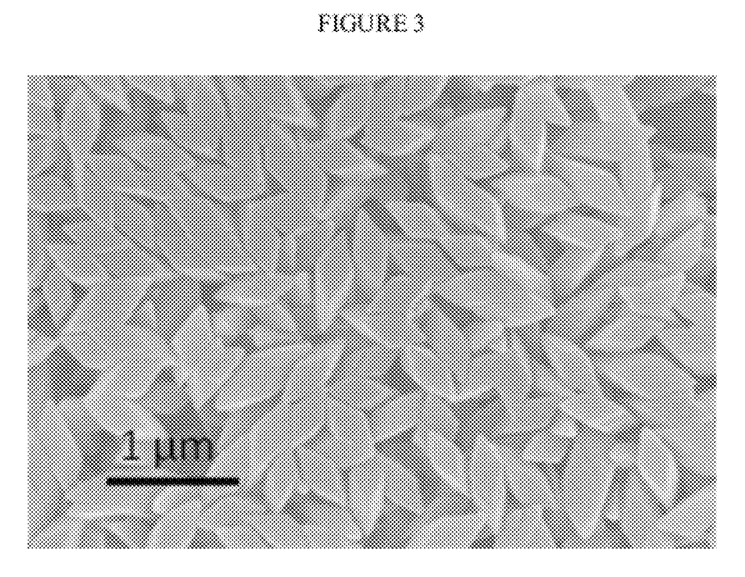
FIG. 3 is an SEM micrograph of diamond-like DDR zeolite nanocrystals with about 500×250 nanometer size.

The calcined crystals were then characterized with XRD, SEM, DLS, and N2 physisorption. The XRD pattern (not shown) agrees well with the reference pattern. SEM image (FIG. 3) revealed that the crystals from this method had a diamond-like morphology with a long axis of about 500 nm and a short axis of about 250 nm. DLS (not shown) confirmed that the average size of the crystals was 398 nm with a polydispersity index of 0.075. BET surface area and pore volume of the crystals from $N_2$ physisorption were 371 $m^2/g$ and 0.132 ml/g, respectively.

Example 3

Smaller Octhedral DDR

Next DDR crystals with octahedron morphology and approximately 300 nanometer size were synthesized. Generally, lowering the temperature and heating time reduced crystal size.

In a typical synthesis, a mixture of ADA, Silica, KF and DI was made with the molar ratio of 6:100:50:10000. ADA was first dissolved in DI water. Due to the low solubility of ADA in water, the resulting mixture was a suspension of ADA in water. Silica was then added to the suspension and mixed. After mixing the suspension for 5-10 minutes, KF was added to the suspension. The mixture was further mixed at room temperature for 2 hours.

After the mixture was prepared, 30 grams of the mixture was poured into an autoclave with a Teflon liner of 45 ml. 5 to 10 grams of seed crystals were added to the autoclave. The autoclave was then sealed and heated up inside an oven. To synthesize nanometer sized octahedral DDR nanocrystals, the temperature should be controlled less than or equal to 150° C. The reaction was maintained for 6 hours with rotational mixing. The autoclaves were then cooled to room temperature. The crystals were collected and washed with DI water and centrifuged for several times. Some of the crystals were calcined at 700° C. for 8 hours to remove the organic template ADA.

Figure 4:
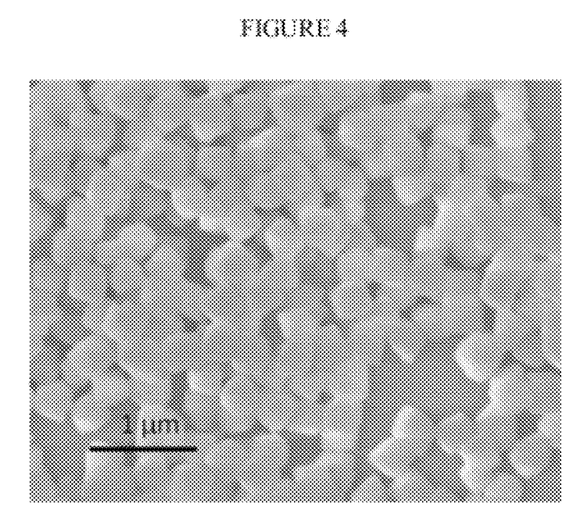
FIG. 4 is an SEM micrograph of octahedral DDR zeolite nanocrystals with about 300 nanometer size.

The calcined crystals were then characterized with XRD, SEM, DLS, and N2 physisorption. The XRD pattern (not shown) agrees well with the reference pattern and that of diamond-like DDR nanocrystals. SEM image (FIG. 4) revealed that the crystals from this synthesis method had an octahedral morphology. DLS (not shown) confirmed that the average size of the crystals was 366 nm with a polydispersity index of 0.034. BET surface area and pore volume of the crystals from $N_2$ physisorption were 346 $m^2/g$ and 0.123 ml/g, respectively.

Example 4

Hexagonal DDR

In this Example, we synthesized a DDR crystal with hexagonal plate morphology and about 500 nanometer size. Adding KOH surprisingly changed the crystal structure from octahedral to hexagonal plate.

To synthesize hexagonal plate DDR nanocrystals, a mixture of ADA, Silica, KF and DI was made with the molar ratio of 6:100:50:10000. ADA was first dissolved in DI water. Silica was then added to the suspension and mixed. After mixing the suspension for 5-10 minutes, KF was added to the suspension. 0.28 grams KOH were added to the mixture after adding KF. The mixture was mixed at room temperature for 2 hours.

After the mixture was prepared, 30 grams of the mixture were poured into an autoclave with a Teflon liner of 45 ml. 5 to 10 grams of seed crystals were added to the autoclave. The autoclave was then sealed and heated up inside an oven. The temperature was set at 150° C. and the chambers rotationally mixed, as above. The reaction was maintained for 6 hours. The autoclaves were then cooled to room temperature. The crystals were collected and washed with DI water and centrifuged for several times. Some of the crystals were calcined at 700° C. for 8 hours to remove the organic template ADA.

Figure 5:
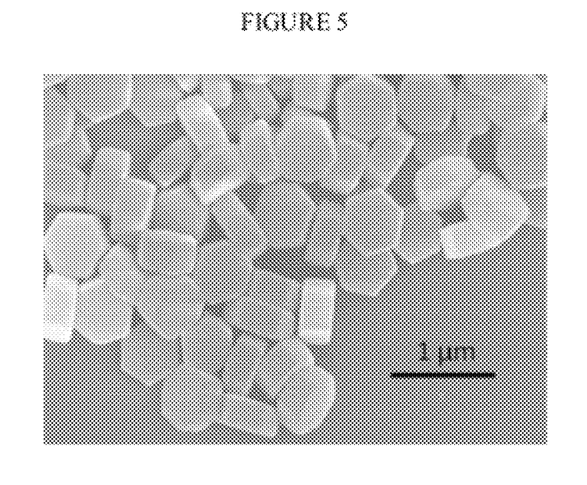
FIG. 5 is an SEM micrograph of hexagonal plate DDR zeolite nanocrystals with about 500 nanometer size.

The calcined crystals were then characterized with XRD, SEM, DLS, and N2 physisorption. The XRD pattern (not shown) agreed well with the reference pattern and that of diamond-like DDR nanocrystals. SEM image (FIG. 5) revealed that the crystals from this synthesis method had a hexagonal plate morphology, which has previously not been reported in literature. DLS (not shown) confirmed that the average size of the crystals was 484 nm with a polydispersity index of 0.055. BET surface area and pore volume of the crystals from $N_2$ physisorption were 356 $m^2/g$ and 0.126 ml/g, respectively.

Table 1 summarized the average size, PDI, BET surface area and Pore volume for the crystals of the four examples described herein.

| DDR Crystal (example no.) | Average size (nm) | Polydispersity Index (PDI) | BET surface area ($m^2/g$) | Pore Volume (ml/g) |
|---|---|---|---|---|
| Octahedron (1) | 2000 | Not available | 348.0 | 0.124 |
| Diamond (2) | 398 | 0.075 | 371.6 | 0.132 |
| Octahedron (3) | 366 | 0.034 | 346.2 | 0.123 |
| Hexagonal plate (4) | 484 | 0.055 | 356.3 | 0.126 |

The crystals prepared herein can be used for any use that DDR zeolites have traditionally been used for. One particular use is for $CO_2$ removal e.g., from refinery or chemical plant waste or natural gas usage.

The following references are incorporated by reference in their entirety.
1. H. Gies, STUDIES ON CLATHRASILS. IX—CRYSTAL STRUCTURE OF DECA-DODECASIL 3R, THE MISSING LINK BETWEEN ZEOLITES AND CLATHRASILS, Zeitschrift für Kristallographie 175, 93-104 (1986).
2. Den Exter, M. J., J. C. Jansen, and H. Van Bekkum, Separation of permanent gases on the all-silica 8-ring clathrasil DD3R in Zeolites and Related Microporous Materials: State of the Art 1994, J. Weitkamp, et al., Editors. 1994. p. 1159-1166.
3. Gascon, J., et al., Accelerated synthesis of all-silica DD3R and its performance in the separation of propylene/propane mixtures. Microporous and Mesoporous Materials, 2008. 115(3): p. 585-593.
4. Yang, Q. L., S. L. Zhong, and X. Lin, Synthesis of DDR-Type Zeolite in Fluoride Medium. Chinese Journal of Inorganic Chemistry, 2009. 25(2): p. 191-194.
5. Tomita, T., K. Nakayama, and H. Sakai, Gas separation characteristics of DDR type zeolite membrane. Microporous and Mesoporous Materials, 2004. 68(1-3): p. 71-75.
6. Himeno, S., et al., Characterization and selectivity for methane and carbon dioxide adsorption on the all-silica DD3R zeolite. Microporous and Mesoporous Materials, 2007. 98(1-3): p. 62-69.

What is claimed is:
1. A method for preparing DDR zeolite crystals, said method comprising the steps of:
   a) combining the following materials to make a mixture: 1-adamantanamine (ADA), deionized water (DI), a silica source, potassium fluoride (KF), and optionally a source of a cation, wherein said mixture comprises about 6 ADA: 100 SiO2: 50 KF: 10000 H2O;
   b) mixing said mixture of step a) for a period of time;
   c) adding seed crystals to said mixture; and
   d) continuing to mix said mixture at a temperature of 100-200° C. for 4-72 hours to make DDR zeolite crystals of 200-3000 nm.
2. The method of claim 1, further comprising washing said DDR zeolite crystals.
3. The method of claim 2, further comprising calcining said washed crystals to remove said ADA.
4. The method of claim 1, wherein the cation is potassium, sodium, calcium, magnesium, manganese, barium, copper, cobalt, or strontium.
5. The method of claim 1, wherein period of time in step b) is between 30 minutes and 6 hours.
6. The method of claim 1, wherein the amount of seed crystals is between 0.0002 and 0.001 grams per ml of mixture.
7. The method of claim 1, wherein the temperature of step d) is 130-160° C.

8. The method of claim 7, wherein the heating time of step d) is between 6 hours and 12 hours.

9. A composition comprising DDR zeolite crystals, said crystals having the following characteristics:
   a) size in the range of 200 to 3000 nm;
   b) a morphology selected from the group consisting of diamond-like, octahedral, and hexagonal plate;
   c) a BET surface area in the range of 340 $m^2/g$ to 380 $m^2/g$; and
   d) a pore volume from 0.123 to 0.132 ml/g.

10. The composition of claim 9, wherein said crystals further comprise one of the following:

| DDR Crystal shape | Average size (nm) |
|---|---|
| Octahedron | 1000-3000 |
| Diamond-like | 200-500 |
| Octahedron | 200-500 |
| Hexagonal plate | 200-500. |

11. The composition of claim 9, wherein said crystals are shaped like a hexagonal plate.

12. The composition of claim 9, said crystal shaped like a diamond, having an average size of 500×250 nm±20%.

13. The composition of claim 9, said crystal shaped like an octahedron, having an average size of 300×300 nm±20%.

14. The composition of claim 9, said crystal shaped like a hexagonal plate, having an average size of 500×500 nm±20%.

15. The composition of claim 9, said crystal shaped like a diamond, having an average size of 500×250 nm±10%.

16. The composition of claim 9, said crystal shaped like an octahedron, having an average size of 300×300 nm±10%.

17. The composition of claim 9, said crystal shaped like a hexagonal plate, having an average size of 500×500 nm±10%.

18. A separation membrane made with the DDR zeolite crystals of claim 9.

19. A method for preparing DDR zeolite crystals, said method comprising the steps of:
   a) combining the following materials to make a mixture: 1-adamantanamine (ADA), deionized water (DI), a silica source, potassium fluoride (KF), and optionally a source of a cation, wherein said mixture comprises about 6 ADA: 100 SiO2: 50 KF: 8000 H2O or about 6 ADA: 100 SiO2: 50 KF: 10000 H2O: 0.005 KOH;
   b) mixing said mixture of step a) for a period of time;
   c) adding seed crystals to said mixture; and
   d) continuing to mix said mixture at a temperature of 100-200° C. for 4-72 hours to make DDR zeolite crystals of 200-3000 nm.

20. The method of claim 19, wherein said mixture comprises about 6 ADA: 100 SiO2: 50 KF: 8000.

21. The method of claim 19, wherein the method is conducted according to the following parameters:

ADA/SiO2: 0.06 to 0.5 molar ratio
KF/SiO2: 0.5 to 1.0 molar ratio
DI/SiO2: 2000 to 14000 molar ratio
KOH: 0-2 molar ratio
i) 6-12 hr heat treatment d) results in smaller crystals (2-500 nm), or
ii) about 48 hr heat treatment d) results in larger crystals (2 μm); and
i) Temperature ≤150° C. results in nanometer octahedrons or
ii) Temperatures ≤150° C. plus KOH (1-2 molar ratio) results in hexagonal plates or
iii) Temperatures ≥160° C. results in diamond-like structures.

22. The method of claim 19, wherein said mixture comprises about 6 ADA: 100 SiO2: 50 KF: 10000 H2O: 0.005 KOH.

23. The method of claim 19, further comprising washing said DDR zeolite crystals.

24. The method of claim 23, further comprising calcining said washed crystals to remove said ADA.

25. The method of claim 19, wherein the cation is potassium, sodium, calcium, magnesium, manganese, barium, copper, cobalt, or strontium.

26. A composition comprising DDR zeolite crystals, said crystals having the following characteristics:
   a) size in the range of 200 to 3000 nm;
   b) a morphology selected from the group consisting of diamond-like, octahedral, and hexagonal plate;
   c) a BET surface area in the range of 340 $m^2/g$ to 380 $m^2/g$; and
   d) a pore volume from 0.123 to 0.132 ml/g, wherein the composition comprises about 6 ADA: 100 SiO2: 50 KF: 10000 H2O.

27. The composition of claim 23, wherein said crystals further comprise one of the following:

| DDR Crystal shape | Average size (nm) |
|---|---|
| Octahedron | 1000-3000 |
| Diamond-like | 200-500 |
| Octahedron | 200-500 |
| Hexagonal plate | 200-500. |

28. The composition of claim 23, wherein said crystals are shaped like a hexagonal plate.

* * * * *